United States Patent [19]

Thompson et al.

[11] 4,386,703
[45] Jun. 7, 1983

[54] FOOD SERVICE TRAY

[75] Inventors: William W. Thompson; Samuel L. Belcher, both of Maumee, Ohio

[73] Assignee: Owens-Illinois, Inc., Toledo, Ohio

[21] Appl. No.: 861,050

[22] Filed: Dec. 15, 1977

[51] Int. Cl.$^3$ .......................... B65D 1/34; B65D 6/04
[52] U.S. Cl. ................................... 206/557; 220/23.6;
220/23.8; 220/405; 211/126; 211/153; 248/146;
126/262; 426/109; 426/113; 165/61
[58] Field of Search .................. 220/23.83, 23.86, 405,
220/406, 408, 410; 206/557, 562, 564, 821, 504;
211/126, 153; 248/146; 165/61, 48; 426/109,
113; 126/262

[56] References Cited

U.S. PATENT DOCUMENTS

| Re. 17,279 | 4/1929 | Copeman | 206/562 |
|---|---|---|---|
| 2,654,500 | 10/1953 | Harstick | 220/408 |
| 3,018,014 | 1/1962 | Opolion | 220/23.83 |
| 3,287,140 | 11/1966 | Brussell | 426/109 |
| 3,401,858 | 9/1968 | White et al. | 220/23.86 |
| 3,672,530 | 6/1972 | Bridenstine et al. | 206/557 |
| 3,952,794 | 4/1976 | Spanoudis | 165/61 X |
| 4,019,022 | 4/1977 | Seider et al. | 165/48 X |

FOREIGN PATENT DOCUMENTS 1205953   2/1960   France ............................ 220/23.83

Primary Examiner—Joseph Man-Fu Moy
Attorney, Agent, or Firm—John R. Nelson; Myron E. Click; David H. Wilson

[57] ABSTRACT

A serving tray for use in a food rethermalizing cabinet. The tray is sectioned by a thermal divider and formed so that dishes of food placed therein can be selectively heated or cooled by separate air streams flowing from one end of the tray to the other. The thermal divider extends from one side of the tray to the other separating the tray interior into two channels. Inlet and outlet ports are provided at opposite ends of each channel. Tapered connectors on the sides of the tray are designed to mate with matching tapered sections in the cabinet such that when the tray is firmly seated in the cabinet, a fluid tight seal exists between the mating connector members. The inlet and outlet ports for each channel are precisely aligned with corresponding ports in the cabinet and the tray is supported thereby in the cabinet and cannot be inserted in reverse orientation.

4 Claims, 9 Drawing Figures

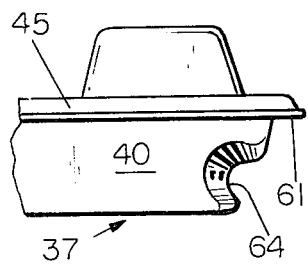
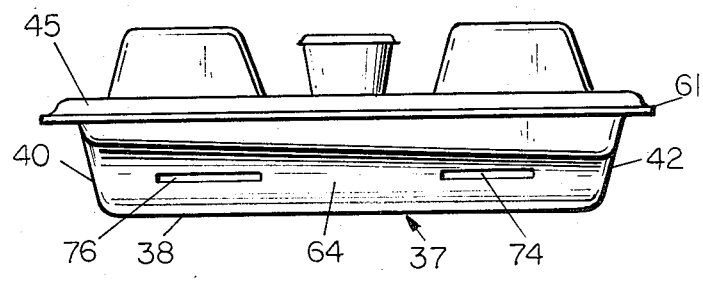
FIG. 4   FIG. 3
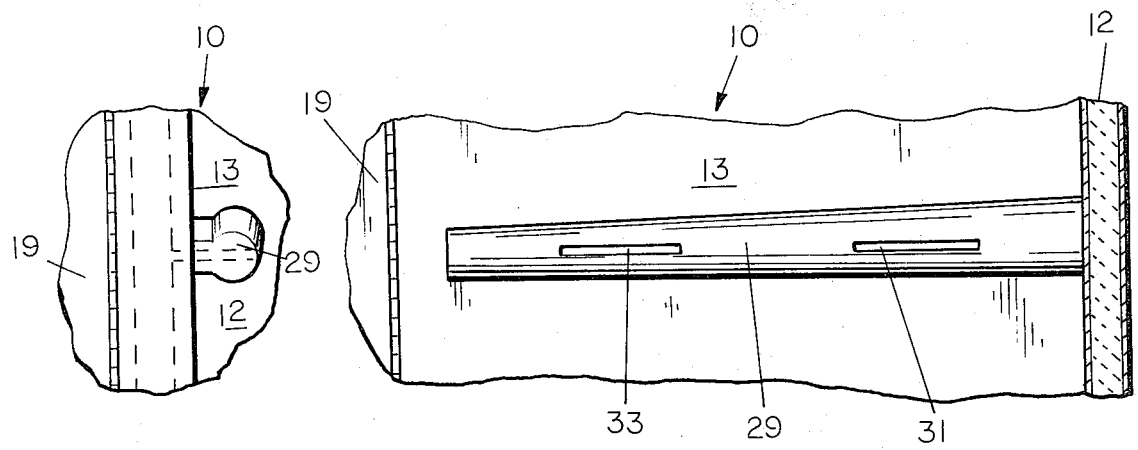
FIG. 7   FIG. 6

FOOD SERVICE TRAY

BACKGROUND OF THE INVENTION

Generally speaking, this invention relates to serving trays for prepared meals having hot and cold foods in separate dishes. More specifically, this invention pertains to an improved serving tray for holding both hot and cold dishes of food and having channels for the passage of heating and cooling air streams over exterior portions of the dishes. Such trays are used in rethermalizing carts or cabinets having means for circulating the air streams through a vertical stack of trays.

Feeding systems utilizing rethermalizing cabinets and serving trays are well known and used particularly in health care institutions such as hospitals, nursing homes and the like. In such systems, food is prepared in a central commissary for distribution at a later time. Preferably all of the constituents of a meal, including the entree, side dishes, dessert, beverage, eating utensils, condiments, napkins, etc., are placed in a serving tray before the tray is inserted into a cabinet where the food is refrigerated until shortly before serving time. Prior to serving time, the portion of the tray containing the dishes of food to be served hot is subjected to heat while refrigeration is continued for the portion containing the dishes to be served cold. Under these conditions it becomes apparent that the tray should be designed so as to provide a thermal barrier between the hot and cold portions of the tray. It is also important to provide a foolproof means for preventing the inadvertent insertion of a tray into the cabinet backwards. Backwards insertion of a tray would result in the cold foods becoming heated and the hot foods remaining refrigerated.

Accordingly, it is an object of this invention to provide an improved serving tray which is of a simple and compact design and has a multifunction thermal divider and a multifunctional means for preventing reverse orientation of the tray in a rethermalizing cabinet.

SUMMARY OF THE INVENTION

Generally speaking, the improved meal serving and storage tray is in the form of a deep pan with a planar rectangular bottom having upstanding perimetric walls. A thermal barrier in the form of an open trough extends from one side of the tray to the other so as to divide it into two separate compartments, one for foods which are to be served hot and the other for foods to be served cold. The top of the tray over each compartment has dish-receiving openings, each of which is surrounded by dish-supporting flanges so when dishes are placed in the openings and all the openings are covered thereby, the compartments become sealed chambers. An inlet opening is provided in the sidewall section of each compartment and likewise an outlet opening is provided through the opposite sidewall section of each compartment. The inlet opening of each compartment has a confronting relationship with its respective outlet opening so the hot or cold conditioning air flows into a compartment through one sidewall and out of the compartment through the opposite sidewall. Thus the mass flow of air is straight through the compartment. A plurality of bluff body projections extending upwardly from the bottom of the tray in each compartment or channel are provided in one embodiment to produce turbulent air flow against the food dishes to enhance heat transfer.

Tapered connector members extend along each sidewall and encompass the inlet and outlet openings. The tapered connectors serve to support the tray in a rethermalizing cabinet, align and seal the tray inlets and outlets with corresponding inlet and outlet openings in the cabinet, and prevent the tray from being inserted in a reverse orientation.

This invention wll be understood best by reading the following detailed description of it with reference to the accompanying drawings illustrating a preferred embodiment of the invention.

BRIEF DESCRIPTION OF THE DRAWINGS

FIG. 3 is an enlarged left side view of the serving tray of FIG. 1.

FIG. 4 is a rear view of a broken away left side portion of the serving tray of FIG. 3.

FIG. 6 is a lateral view of a cabinet connector member.

FIG. 7 is a view of the connector member of FIG. 6 looking from its smaller front end to its larger rear end showing its cross-sectional configuration.

DETAILED DESCRIPTION OF THE INVENTION

Figure 1:
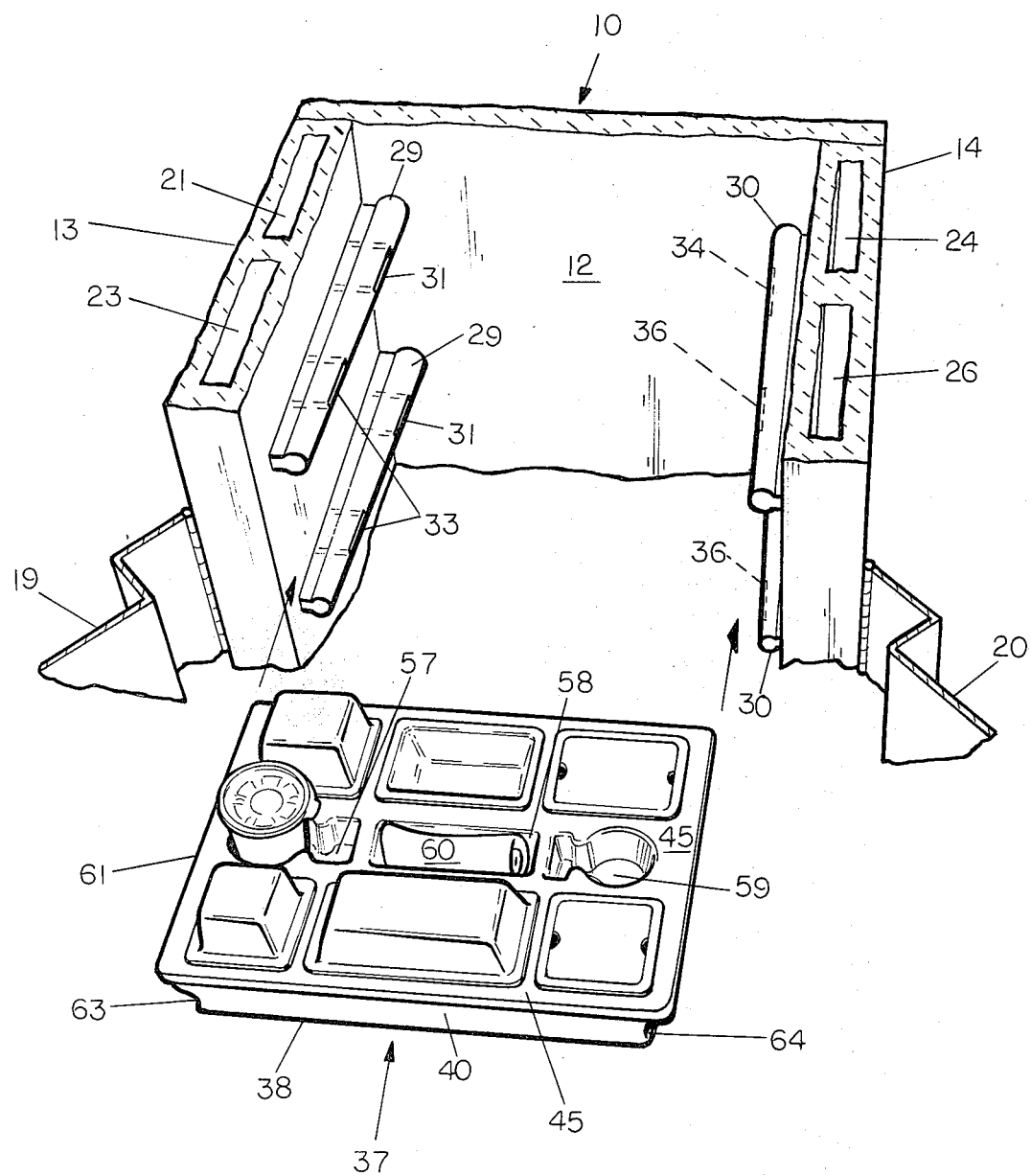
FIG. 1 is a perspective sectional view of a rethermalizing cabinet and a loaded serving tray positioned for insertion therein.

Like reference numerals are applied to similar parts in the various embodiments.

Figure 2:
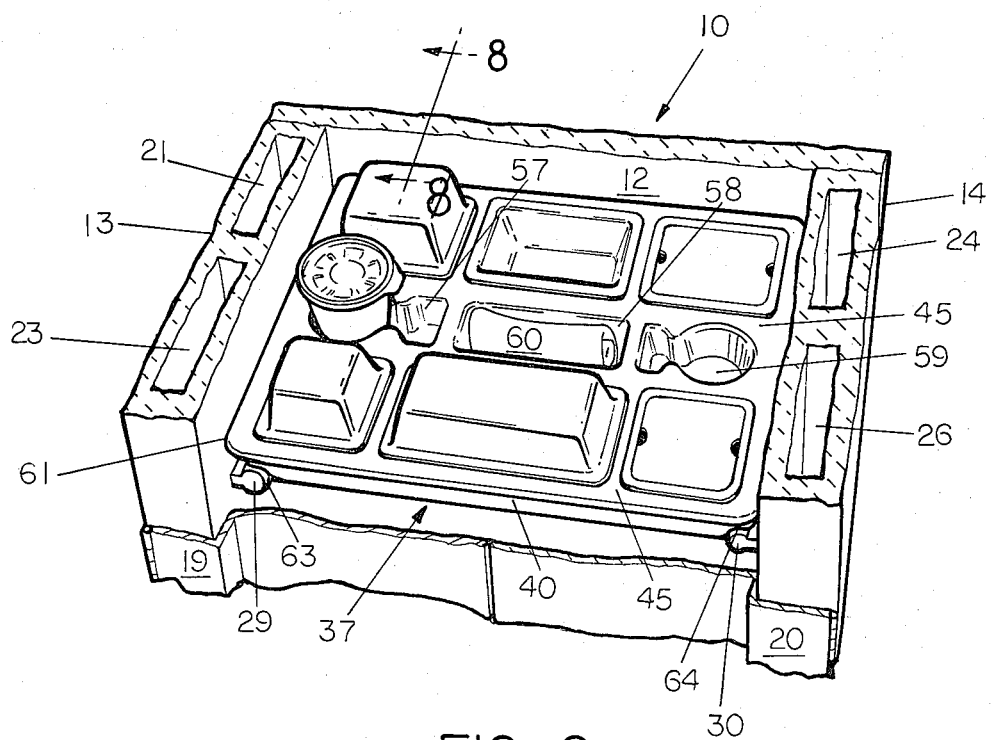
FIG. 2 is a perspective sectional view similar to FIG. 1 but with the tray in a fully inserted position and the doors of the rethermalizing cabinet closed.
Figure 5:
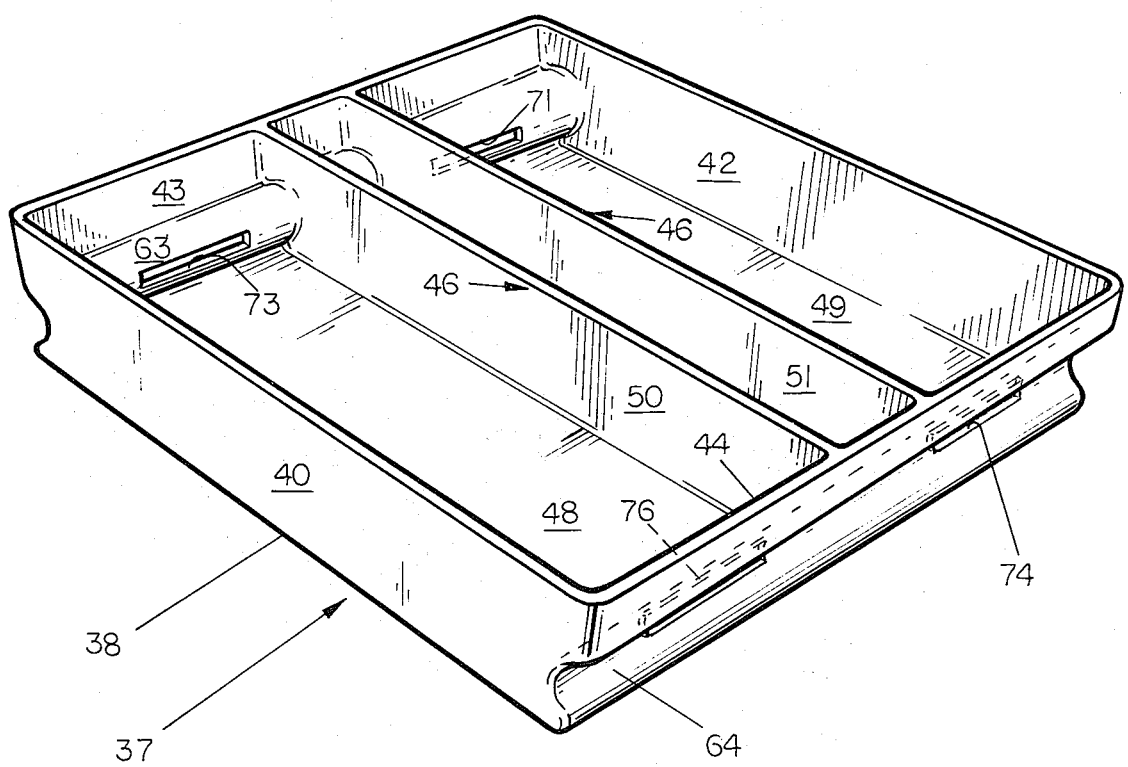
FIG. 5 is a perspective view of the serving tray of FIG. 1 with the top portion broken away to show internal details.

Referring to the drawings, a section of a rethermalizing cabinet 10 is shown in FIGS. 1 and 2. It has a rear wall 12, a parallel pair of sidewalls 13, 14, and a pair of doors 19, 20 hinged to the front edge of the sidewalls. The sidewalls 13, 14 are mirror images of one another and each has a spaced-apart pair of vertically disposed rectangular ducts 21, 23, and 24, 26 contained in their interior surrounded by insulation. These ducts communicate with the cabinet interior via a series of respective pairs of wall apertures located at selected levels. An air recirculation system (not shown) including heating and cooling means is used to selectively supply refrigerated or hot air to the ducts. For the sake of description, the two ducts 23, 26 in the front half of the cabinet will be denoted the hot air recirculating ducts and the two rear ducts 21, 24 will be designated the cold air recirculating ducts. Also the pair of ducts 24, 26 in the sidewall on the right side of FIG. 1 will be designated the input ducts and the pair of ducts 21, 23 to the left side will be designated the return ducts. It is to be understood that the designated ducts could be reversed and that cold air could be circulated through the hot air ducts without departing from the invention.

Horizontally disposed tapered male connector members 29, 30 are affixed to the sidewalls at the various wall opening levels. In the preferred embodiment shown in the drawings, the tapered portion of the members has a circular cross-section which increases uniformly from the front end to the rear end thereof as can be seen especially in FIGS. 3-7. Connector members having triangular or rectangular cross-sections could also be used. Openings 31, 33 and 34, 36 aligned with the respective wall openings extend through the connector members 29, 30.

The serving and storage tray 37 illustrated in FIG. 1 is filled with food dishes and is positioned directly in front of the cabinet for insertion into the open cabinet. FIGS. 2-6 show various portions of the tray. Preferably the tray is molded from plastic material such as polycarbonate and has a planar rectangular bottom 38 with upstanding front 40, rear 42 and sidewalls 43, 44 integrally attached to the periphery of the bottom. A dish-supporting top 45 is sealingly connected to the upper edges of the walls. A thermal barrier 46 extending from one end wall to the other about midway between the front and rear walls 40, 42 divides the tray into two compartments 48, 49 (see FIG. 5). The top of the barrier 46 is level with the tops of the side and end walls and is also sealed to the tray top 45. Preferably the barrier is in the form of an open trough made by a pair of spaced-apart parallel wall members 50, 51 integrally attached or bonded to the top 45, bottom 38 and sidewalls 43, 44.

Figure 8:
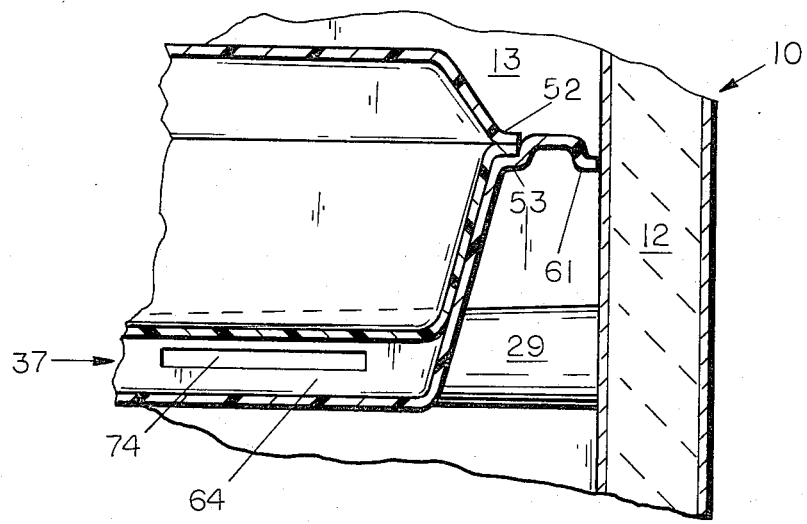
FIG. 8 is a sectional view taken along lines 8—8 of FIG. 2.
Figure 9:
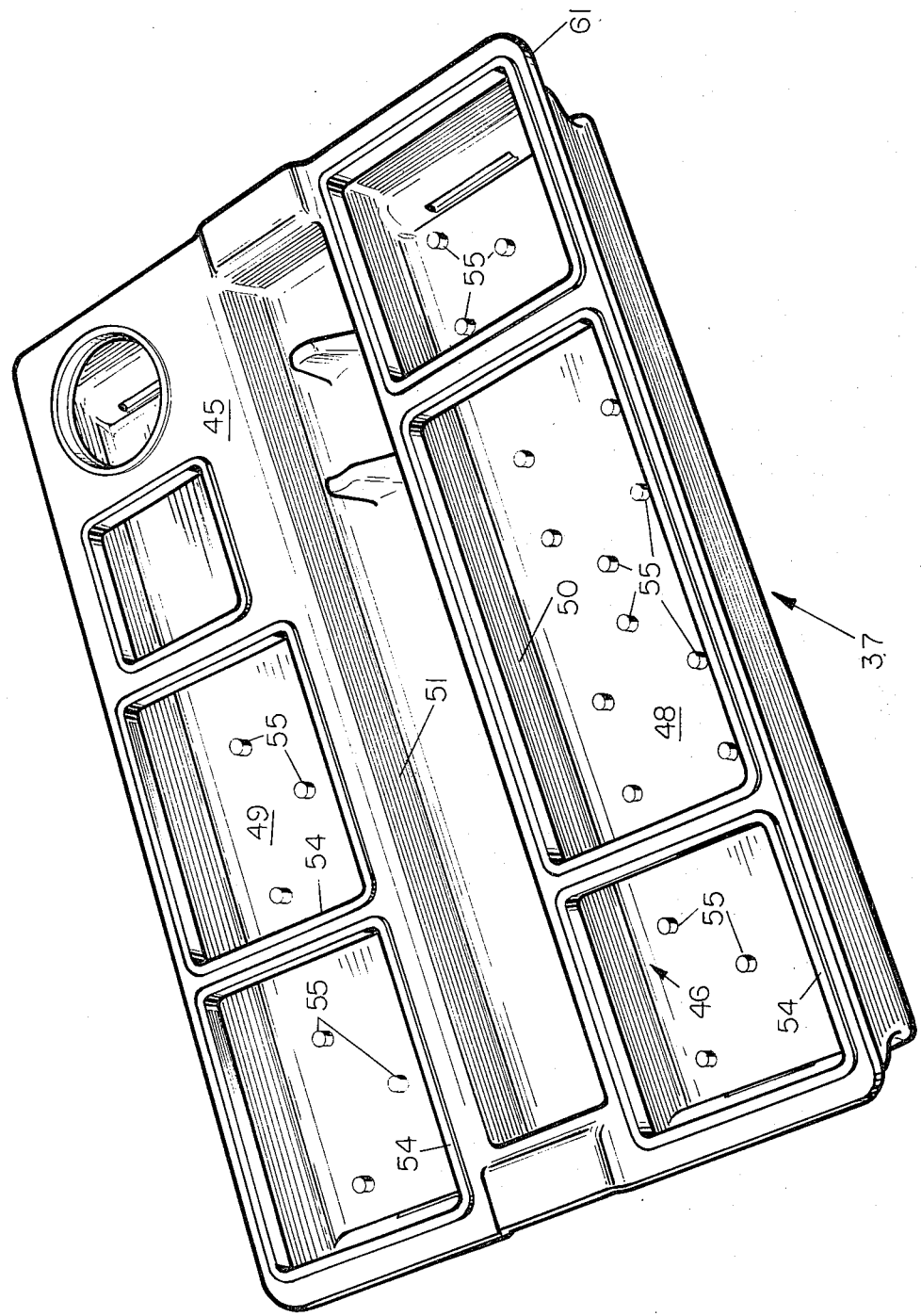
FIG. 9 is a perspective view of an embodiment of a tray with bluff body projections on the inside and with raised peripheral flanges around the dish-receiving openings.

The top 45 of the tray has two series of dish-receiving openings. One series is above the compartment 48 for the hot foods and the other is above the compartment 49 for the cold foods. Each opening has a peripheral flange with a planar surface for supporting a tray and forming a seal between the tray and a dish by sealingly contacting the underside surface of an outwardly extending rim 52 of a dish. In the embodiment of FIG. 8, the flange has a recessed step 53 so that the dish rim is seated in the recess. The embodiments of FIG. 9 has a raised rib 54 which extends above the adjacent surrounding surface of the tray top. The configuration and size of the openings may be such that each one is distinctive and matches only one prescribed dish of a series so as to insure that the hot foods are not insertable over the compartment for cold foods. The openings may be round, square, rectangular or triangular, and the openings of the hot food side may be substantially wider than those on the cold food side. When the dish openings are all filled with dishes or other appropriate receptacles, thus closing the openings, the tray compartments become sealed air stream chambers through which air may be circulated in contact with the outside surfaces of the dishes. A plurality of bluff body posts or projections 55 extending vertically upward from the bottom of each chamber at spaced-apart locations under the dishes may be provided to cause turbulence in the air stream, particularly in the vicinity of the dish bottoms (see FIG. 9). Preferably, the posts terminate in a blunt or flat top surface level with the established bottom line of the dishes and are tapered at least slightly to a reduced dimension from bottom to top. The posts 55 provide support for the bottoms of the dishes and thus enable the use of lighter weight disposable dishes. The portion of the top of the tray lying between the two compartments and which fits down into the thermal barrier may have specially shaped depressions 57, 58, 59 designed to hold specific items such as napkin-wrapped eating utensils 60 and packaged condiments which need not be specially heated or cooled but are preferably kept at ambient or room temperature. Also the periphery 61 of the top of the tray may extend outwardly beyond the front, rear and sidewalls and be sized to match the interior size of the cabinet so as to effectively reduce the passage of food orders from one tray to an adjoining tray situated above or below any tray (see FIG. 4).

Tapered wedge-type connector members 63, 64 extend from the front 40 to the back 42 along each sidewall 43, 44 of the tray and are designed to mate with the corresponding connector members 29, 30 on the cabinet sidewalls. In the illustrated embodiment, the tray connector members 63, 64 are of the female type for mating with the male-type cabinet connector members. The taper increases uniformly from a smaller diameter at the front wall of the tray to the back wall thereof, preferably at an angle of about 2° and suitably between 1° and 5°. It is to be understood that the connector members could be switched so that the female members would be on the cabinet and the male members on the tray without departing from the invention. Also, the cross-sectional configuration of the connector members may be varied from the generally circular one shown. Connector members having triangular, rectangular or semicircular cross-sections could be used effectively. A pair of elongated apertures 71, 73 or 74, 76 is provided along the center line of each connector member. These apertures are shaped to match the corresponding apertures 31, 33 and 34, 36 in the connector members of the cabinet and are located so as to be aligned therewith when the cabinet and tray connector members are fully seated together. Also, the pair of apertures 74, 76 on one end wall of a tray is directly aligned with the pair of apertures 71, 73 on the other end wall so that the mass flow of air through each of the respective compartments 48, 49 of a tray 37 is in one direction.

This invention has been described and illustrated with respect to a preferred embodiment, but it is to be understood that modifications may be made without departing from the scope of the invention as defined in the following claims.

We claim:

1. An improved food-serving and storage tray for use in a cabinet, said tray comprising a generally planar bottom, an upstanding perimetric wall with front, rear and end wall sections, a thermal divider extending from one of said end wall sections to the opposite end wall section, defining with said walls two separate parallel thermalizing air channels, one on each side of said divider, a top having a plurality of dish-receiving apertures, said receiving apertures opening into said channels and being designed to hold food dishes in sealing conformity therein with a substantial portion of each dish protruding downwardly into its respective air channel, and a pair of oblong apertures through each of said end wall sections, each one of said pair opening into its respective one of such channels with the apertures of a channel being in directly confronting alignment with one another so the mass flow of air is in one direction through a channel, each of said end walls having a tapered wedge connector member formed therein encompassing said pair of oblong apertures, said connector extending from said front wall section to said rear wall section and being uniformly tapered from a smaller diameter at the rear end thereof to a larger diameter at the front end.

2. An improved food-serving and storage tray for use in a thermalizing cabinet, said tray comprising a generally planar bottom, an upstanding perimetric wall with front, rear and end wall sections, a thermal divider extending from one of said end wall sections to the opposite end wall section to form a channel on each side of said divider, a top having a plurality of dish-receiving apertures, opening into said channels, said receiving apertures being designed to hold food dishes in sealing conformity therein with a substantial portion of each dish protruding downwardly into its respective channel, wedge-type tapered connecting members extending from the front to the back of each end wall, and a pair of oblong apertures through each of said member opening into corresponding channels.

3. An improved food-serving and storage tray according to claim 2 wherein said members are tapered from a larger dimension to a smaller dimension in a rearward direction.

4. A tray according to claim 2 wherein bluff body projections extend upwardly from the bottom of the tray under the dish-receiving apertures.

* * * * *